United States Patent Office 3,036,993
Patented May 29, 1962

3,036,993
SYNTHETIC RESINS SOLUBLE IN ETHANOL AND DERIVED FROM TETRAHYDRONAPHTHYL-HYDROXYPHENYLMETHANE AND FORMALDEHYDE, AND A PROCESS OF PRODUCING SAME
Ferdinand Meyer, Ziegelhausen (Neckar), and Horst Erich Knobloch, Ludwigshafen (Rhine), Germany, assignors to Badische Anilin- & Soda-Fabrik Aktiengesellschaft, Ludwigshafen (Rhine), Rheinland-Pfalz, Germany
No Drawing. Filed Mar. 17, 1959, Ser. No. 799,862
Claims priority, application Germany Mar. 18, 1958
10 Claims. (Cl. 260—51)

This invention relates to synthetic resins soluble in ethanol and derived from tetrahydronaphthyl-hydroxyphenylmethane and formaldehyde, and a process of producing same.

It is known that fast-hardening synthetic resins are obtained by reacting oxygen-containing condensation products of aromatic hydrocarbons and aldehydes with phenols and condensing the resultant products, together with compounds which react in the presence of aldehydes with the formation of hardenable resins, with aldehydes, preferably with formaldehyde. With acid condensing agents there are thereby obtained resins of the character of novolaks. By condensation in alkaline medium on the other hand, resole type resins are formed. All these resins contain certain amounts of unreacted hydrocarbons which are not easy to remove technically.

It is also known to prepare aralkylphenols from chlormethylated aromatic hydrocarbons and phenols and to condense these, if desired together with unsubstituted phenols, with formaldehyde. The hardenable resins thus obtained, however, are insoluble in ethanol and therefore cannot be used as electrical insulating lacquers.

We have now found that rapidly-hardening synthetic resins which are soluble in ethanol are obtained in a simple manner by condensing with formaldehyde a mixture of 60 to 90% by weight, and preferably 65 to 80% by weight, of tetrahydronaphthyl-hydroxyphenylmethane and 40 to 10% by weight, and preferably 35 to 20% by weight, of another phenol, using a basic condensing agent.

Tetrahydronaphthyl-hydroxyphenylmethane can be obtained in the usual way by chlormethylation of tetrahydronaphthlene, that is, by the action of formaldehyde or paraformaldehyde and hydrogen chloride on tetrahydronaphthalene, and by the reaction of the resultant chlormethylated product with at least one mole of phenol. In general, 1 mol of tetrahydronaphthalene is reacted with about 1 to 1.5 mols of formaldehyde and 1 to 1.5 mols of hydrogen chloride. The best results are achieved by using about 2 to 3 mols of phenol, whereas still larger amounts of phenol do not in general bring any advantage.

Other phenols which may be used in admixture with tetrahydronaphthyl-hydroxyphenylmethane include, besides phenol itself, for example the alkylphenols in which the alkyl group preferably has up to 5 carbon atoms, as for example para-cresol, meta-cresol, ortho-cresol, para-hydroxydiphenyl or para-tertiary butylphenol, and also in general monohydric mononuclear phenols. Polyhydric and polynuclear phenols, however, are also often suitable; examples of these are resorcinol, hydroquinone, 4,4′-dihydroxydiphenyldimethylmethane, dihydroxydiphenyl-cyclohexane, 4,4′-dihydroxydiphenylmethane and 4,4′-dihydroxydiphenyl oxide. To each mol of tetrahydronaphthyl-hydroxyphenylmethane there is chosen such an amount of another phenol that for each mol of tetrahydronaphthyl-hydroxyphenylmethane there is at least 0.8 mol of a phenolic hydroxyl group of the other phenol used in the mixture and up to about 3 mols of such a phenolic hydroxyl group. It is especially favorable to use 1 to 1.5 mols of phenolic hydroxyl groups of the other phenol with reference to one mol of tetrahydronaphthyl-hydroxyphenylmethane.

The mixture of tetrahydronaphthyl-hydroxyphenylmethane and another phenol is condensed with formaldehyde according to this invention while using a basic condensing agent. In general, there is used about 0.6 to 3 mols, and preferably 0.8 to 2.5 mols, of formaldehyde to 1 mol of phenolic hydroxyl group. The formaldehyde may be used in the form of paraformaldehyde or in aqueous solution, for example in 30 to 40% aqueous solution.

As the basic condensing agent there may be used all the substances of this kind usually employed in the production of hardenable phenol resins (resoles), as for example primary, secondary or tertiary mono- or poly-valent amines, such as propylamine, pyridine, piperazine, ethylene diamine, benzidine, diethylamine, methylaniline or dimethylaniline, and also ammonia, alkaline earth metals, as for example magnesium or calcium, basic metal oxides, especially alkali or alkaline earth metal oxides or their hydroxides, such as magnesium oxide, calcium oxide, sodium hydroxide or potassium hydroxide, and also salts of weak acids with strong bases, as for example sodium carbonate, potassium carbonate, sodium sulfite or sodium bicarbonate. The pH value of the aqueous reaction medium should be greater than 7, especially advantageously between 7.1 and 8.5, but the pH may also be far above 8, as for example 10 or 11.

The basic condensing agent is used in amounts of between about 0.1 and 10% by weight with reference to the mixture of tetrahydronaphthyl-hydroxyphenylmethane and another phenol, if the condensation reaction is carried out at elevated temperature, for example at 70 to 110° C. Under these conditions the reaction proceeds most rapidly. It is also possible, however, to carry out the condensation at temperatures below 70° C. and even at room temperature. In this case it may be preferable to use larger amounts of the basic condensing agent, for example up to about 25% by weight with reference to the phenol mixture.

The condensation is continued until a resinous reaction product has been obtained. Then the water contained in the reaction mixture is removed, for example by distillation in vacuo. A viscous to solid resin which has especially favorable properties is obtained when it has a viscosity of more than 5000 centipoises. It dissolves well in ethanol.

If this resin is heated, it hardens and progressively loses its solubility in ethanol. The hardening reaction of the resin can also be effected by mixing with acid hardening agents at room temperature. In order to achieve a hardening in technically interesting periods, for example in 10 to 20 minutes, heating is usually carried out to temperatures between about 110° and 200° C., and especially between 140° and 180° C. If hardening is desired at temperatures below 110° C. and especially at room temperature, i.e. at temperatures above 10° C., inorganic and organic acids, especially, may be used as hardening agents. Especially suitable inorganic acids include strong inorganic acids, such as hydrochloric acid, sulfuric acid or phosphoric acid, and as organic acids there may be used for example acetic acid, adipic acid, phthalic acid, acrylic acid, maleic acid, tetrachlorphthalic acid or paratoluenesulfonic acid. Monobasic or polybasic saturated or unsaturated acids and mixtures of the same may be used quite generally. They are usually employed in amounts between about 0.2 and 15% by weight with reference to the anhydrous resin to be hardened.

The resins obtained are suitably used as alcoholic solutions except in cases where they are of such low viscosity that they can be worked up without solvent. Such an amount of alcohol is added that the resultant resin solutions can readily be brushed. The most suitable alcohols are for example ethanol, propanol, butanol, amyl alcohol, hexanol, cyclohexanol and saturated monohydric alcohols with up to about 8 carbon atoms in general. Glycols may also be used, as for example ethylene glycol, propylene glycol or hexane-diol. Often it is favorable to use up to 100% or even 150% by weight of an alcohol with reference to the anhydrous resin, depending on the viscosity of the resin. There may be additionally co-employed organic liquids which do not dissolve the resin in amounts up to about 50% by weight with reference to alcohol. Examples of these organic liquids are the saturated hydrocarbons often used in the lacquer industry, as for example xylene, toluene, gasoline or gasoline fractions or in general aliphatic, cycloaliphatic or aromatic liquid hydrocarbons.

The hardened resins are extremely resistant chemically. They may be used with advantage in all cases where phenol resins have hitherto been used, especially in the electrical industry and for the production of hard papers. The resins are extremely stable to alkalies and water. The dielectric properties of the resins are superior to those of pure phenol or cresol resins.

The following examples will further illustrate this invention but the invention is not restricted to these examples. The parts specified in the examples are parts by weight.

*Example 1*

The tetrahydronaphthyl-hydroxyphenylmethane used is prepared in the usual way as follows:

Hydrogen chloride gas is led at 70° C. for 12 hours into a mixture of 132 parts of tetrahydronaphthalene and 200 parts of 30% aqueous formaldehyde solution. After drying, the reaction product has the density 1.143 at 15° C. and contains 19.7% of chlorine. It is added slowly at 40° C. to an equal weight of phenol. The whole is then heated for another 2 hours at 80° to 90° C. The mixture containing tetrahydronaphthyl-hydroxyphenylmethane and phenol obtained has a viscosity of about 6000 centipoises.

*Example 2*

300 parts of the mixture containing tetrahydronaphthyl-hydroxyphenylmethane obtained according to Example 1 are neutralized with a little caustic soda solution and then condensed with 300 parts of a 30% aqueous formaldehyde solution and 15 parts of magnesium for 80 minutes at 100° C. and a pH value of 7.1 to 7.3 until the reaction mixture has a resinous, sticky consistency. It is then dehydrated at 15 mm. Hg until the internal temperature of the resin has reached 100° C. From 100 parts of the phenol mixture there are obtained 110 parts of a solid yellow-brown clear resin with the softening point 85° C. which has unlimited solubility in ethanol.

*Example 3*

300 parts of the mixture containing tetrahydronaphthyl-hydroxyphenylmethane obtained according to Example 1 are condensed with 300 parts of a 30% aqueous formaldehyde solution and 11 parts of concentrated ammonia for 60 minutes at 100° C. The product is then dehydrated at 15 mm. Hg until the internal temperature of the resin is 90° C. From 100 parts of tetrahydronnaphthyl-hydroxyphenylmethane there are thereby obtained 115 parts of a solid yellow resin which softens at 63° C. and which has unlimited solubility in ethanol.

A 50% solution of this resin in ethanol serves for impregnating paper which, after drying and pressing in several layers at up to 170° C. and a pressure of 180 kg. per square centimeter, yields a hard paper having especially good dielectric properties.

*Example 4*

300 parts of a phenol mixture prepared according to Example 1 are well mixed with 400 parts of 30% aqueous formaldehyde solution and 40 parts of a 50% caustic soda solution and kept at room temperature for 2 days. Then sulfuric acid is added to the resin until it has a neutral reaction and the precipitated resin is separated from the aqueous layer in a separating funnel. After removing water by distillation in vacuo up to an internal temperature of the resin of 80° C., 360 parts of a viscous resin are obtained with a viscosity of 5800 centipoises.

A solution of this resin in ethanol is applied to wood after the addition of 10% of a 5% hydrochloric acid in ethanol. After 24 hours a scratch-proof, very resistant lacquer coating is obtained.

We claim:

1. A process for the production of synthetic resins that are soluble in ethanol which comprises condensing a mixture of 60 to 90% by weight of tetrahydronaphthyl-hydroxyphenylmethane and 40 to 10% by weight of a second phenol selected from the group consisting of phenol, para-cresol, meta-cresol, ortho-cresol, para-hydroxydiphenyl or para-tertiary butylphenol, resorcinol, hydroquinone, 4,4′-dihydroxydiphenyldimethylmethane, dihydroxydiphenyl-cyclohexane, 4,4′-dihydroxydiphenylmethane, and 4,4′-dihydroxydiphenyl oxide with formaldehyde in an aqueous formaldehyde solution reaction medium having a pH of from about 7.1 to about 11, the molar ratio of tetrahydronaphthyl-hydroxyphenylmethane to the phenolic hydroxyl groups of said second phenol being from about 1:0.8 to about 1:3.

2. A process for the production of synthetic resins that are soluble in ethanol which comprises condensing a mixture of 60 to 90% by weight of tetrahydronaphthyl-hydroxyphenylmethane and 40 to 10% by weight of a second phenol selected from the group consisting of phenol, para-cresol, meta-cresol, ortho-cresol, para-hydroxydiphenyl or para-tertiary butylphenol, resorcinol, hydroquinone, 4,4′-dihydroxydiphenyldimethylmethane, dihydroxydiphenyl-cyclohexane, 4,4′-dihydroxydiphenylmethane, and 4,4′-dihydroxydiphenyl oxide with formaldehyde in an aqueous formaldehyde solution reaction medium having a pH of from about 7.1 to about 11, the molar ratio of tetrahydronaphthyl-hydroxyphenylmethane to the phenolic hydroxyl groups of said second phenol being from about 1:1 to about 1:1.5.

3. A process for the production of synthetic resins that are soluble in ethanol which comprises condensing a mixture of 60 to 90% by weight of tetrahydronaphthyl-hydroxyphenylmethane and 40 to 10% by weight of a second phenol selected from the group consisting of phenol, para-cresol, meta-cresol, ortho-cresol, para-hydroxydiphenyl or para-tertiary butylphenol, resorcinol, hydroquinone, 4,4′-dihydroxydiphenyldimethylmethane, dihydroxydiphenyl-cyclohexane, 4,4′-dihydroxydiphenylmethane, and 4,4′-dihydroxydiphenyl oxide with formaldehyde in an aqueous formaldehyde solution reaction medium having a pH of from about 7.1 to about 8.5, the molar ratio of tetrahydronaphthyl-hydroxyphenylmethane to the phenolic hydroxyl groups of said second phenol being from about 1:1 to about 1:1.5.

4. A process as in claim 1 wherein 0.6 to 3 mols of formaldehyde are used for each mol of said phenolic hydroxyl groups.

5. A process as in claim 1 wherein 0.8 to 2.5 mols of formaldehyde are used for each mol of said phenolic hydroxyl groups.

6. A process as in claim 1 wherein the condensation is carried out at a temperature between about room temperature and about 110° C.

7. A process as in claim 1 wherein the condensation is carried out at a temperature between about 70° C. and 110° C.

8. A process as claimed in claim 1 wherein the alkaline reaction medium is effected by addition of a basic condensing agent which is used in an amount of between about 0.1 and 10% by weight with reference to the mixture of tetrahydronaphthyl-hydroxyphenylmethane and the second phenol.

9. A synthetic resin soluble in ethanol which has been obtained by condensing a mixture of 60 to 90% by weight of tetrahydronaphthyl-hydroxyphenylmethane and 40 to 10% by weight of a second phenol selected from the group consisting of phenol, para-cresol, meta-cresol, ortho-cresol, para-hydroxydiphenyl or para-tertiary butylphenol, resorcinol, hydroquinone, 4,4'-dihydroxydiphenyldimethylmethane, dihydroxydiphenylcyclohexane, 4,4'-dihydroxydiphenylmethane, and 4,4'-dihydroxydiphenyl oxide with 0.6 to 3 mols of formaldehyde per mol of the mixture of tetrahydronaphthyl-hydroxyphenylmethane and the other phenol, with the addition of a basic condensing agent in an aqueous formaldehyde solution reaction medium having a pH of from about 7.1 to about 11 at a temperature between about room temperature and about 110° C., the molar ratio of said tetrahydronaphthyl-hydroxyphenylmethane to the phenolic hydroxyl groups of the second phenol being from about 1:0.8 to about 1:3, the resultant resin having a viscosity in the anhydrous state of more than 5,000 centipoises.

10. A solution in a monohydric saturated alcohol having up to 8 carbon atoms of a synthetic resin obtained by condensing a mixture of 60 to 90% by weight of tetrahydronaphthyl-hydroxyphenylmethane and 40 to 10% by weight of a second phenol selected from the group consisting of phenol, para-cresol, meta-cresol, ortho-cresol, para-hydroxydiphenyl or para-tertiary butylphenol, resorcinol, hydroquinone, 4,4'-dihydroxydiphenyldimethylmethane, dihydroxydiphenylcyclohexane, 4,4'-dihydroxydiphenylmethane, and 4,4'-dihydroxydiphenyl oxide with 0.6 to 3 mols of formaldehyde in an aqueous formaldehyde solution reaction medium having a pH of about 7.1 to about 8.5, the molar ratio of said tetrahydronaphthyl-hydroxyphenylmethane to the phenolic hydroxyl groups of said second phenol being from about 1:0.8 to about 1:3.

References Cited in the file of this patent
UNITED STATES PATENTS

| | | |
|---|---|---|
| 2,283,437 | Hentrich et al. | May 19, 1942 |
| 2,597,159 | May | May 20, 1952 |

FOREIGN PATENTS

| | | |
|---|---|---|
| 305,575 | Germany | Jan. 4, 1921 |